Figure 1:
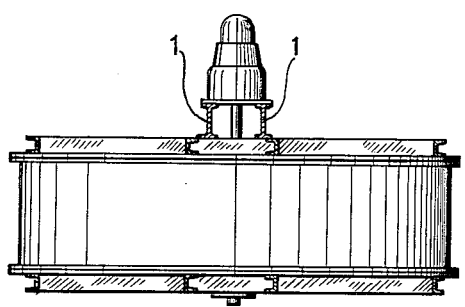

United States Patent Office 2,726,849
Patented Dec. 13, 1955

2,726,849
SUPPORTING STRUCTURE FOR ROTORS OF REGENERATIVE AIR PREHEATERS

Ernst Heinrich Mudersbach, Heidelberg, Germany, assignor to Svenska Rotor Maskiner Aktiebolaget, a corporation of Sweden Application November 19, 1951, Serial No. 257,073

Claims priority, application Germany November 23, 1950

6 Claims. (Cl. 257—6)

This invention relates to rotary regenerative air preheaters, particularly of the Ljungström type.

In rotary regenerative air preheaters of the above type a rotor carries heat absorbing material in the form of metal plates which are firstly positioned in a flue gas passage to absorb heat and then, upon rotation of the rotor, become located in an air flow passage to impart heat to air flowing there through. The heat transfer mass is provided in sector shaped compartments of the rotor which are normally separated from the two passages for gas and air by means of sector shaped plates disposed one at each face of the rotor at the zones between the passages. These sector-shaped plates divide the effective circular area above and below the rotor into two inlet and outlet openings forming together approximately a complete circular area. In rotary regenerative air preheaters hitherto known the planes of the end plates separating the flow channels of the heat delivering and heat absorbing media, are located diametrically opposed each other, so that each channel will take the place of half the effective circular rotor area. The main beam is then provided with two arms which are in the separating region and also placed diametrically. The ratio between these two through flown areas is then fixed and ordinarily of the order of unity. Depending on the actual driving conditions another ratio between the through flown areas of the channels for air and gas may be desirable. When driving a steam boiler for example the ratio between the flue gas volume passing the air preheater to the air volume to be heated depends on the qualities of the fuel, the gas volume often being considerably greater than the air volume. If the cross section areas of the channels are equal this will in the latter case result in a considerably higher velocity of gas flow as compared with that of the air flow which in turn gives greater loss in the gas flow. Considering the suction conditions in the gas flow, particularly with respect to the capacity of the suction device or fan for moving the gas flow, it is desirable to hold down the velocity of gas flow. On the other hand, the fact is that in this case the resistance to flow in the air channel is relatively small and, therefore, there are no difficulties to drive the relatively cold combustion air through the preheater by means of a correspondingly high pressure difference.

Further it is desirable to hold the temperature of the heat transfer surface at the outlet side of the gas channel so high that the dew-point of the flue gas is not passed below so as to avoid corrosion of the heat transfer surface. To obtain this result it is possible to increase the temperature of the heat transfer mass by increasing that portion of the regenerative mass passed by gas and at the same time decrease that portion of the regenerative mass passed by air without changing the other driving conditions. In a known manner the cross sectional area of the gas channel may be increased by placing this channel close up to the diametrical beam supporting the rotor, but this has the drawback that this beam, also by good isolation, is considerably heated so that it will expand and bend unallowably. It is also possible to shield off part of one channel so that the total heat transfer surface of the rotor is reduced therein whereas said surface in the other channel remains unchanged. This will, however, involve the great disadvantage that by setting part of the heat transfer surface out of action the total unit has to be built correspondingly larger to obtain the same capacity and this solution is, therefore, very uneconomical.

All of the disadvantages mentioned above are avoided by means of the air preheater according to the present invention which as its principal object has to provide means which enable to correctly fit the through-flow areas of the channels to each other relatively to the requirements of the actual driving conditions.

Another object of the invention is the provision of three carrier arms for supporting the relatively heavy rotor, one of which passes through the gas channel.

A further object of the invention is to provide isolating means for that carrier arm crossing the gas channel.

Figure 3:
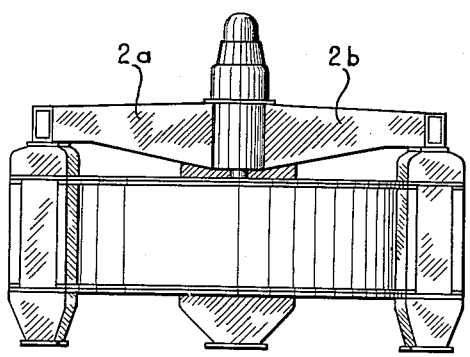
Figure 2:
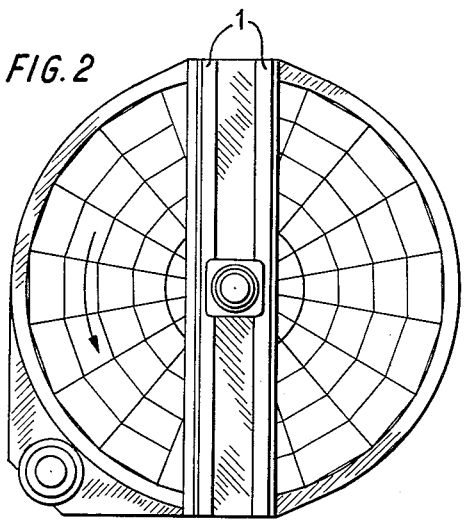
Figure 4:
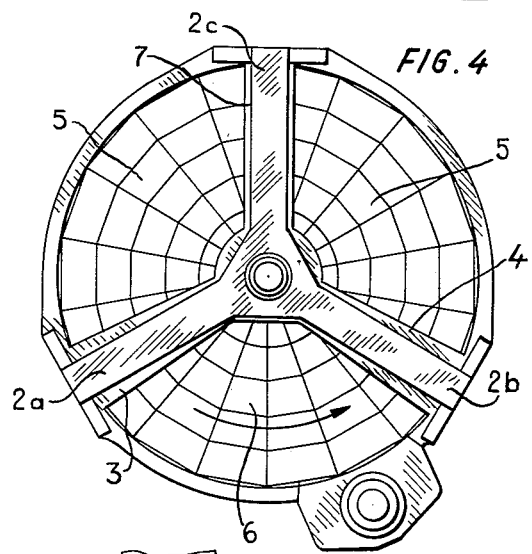
Figure 5:
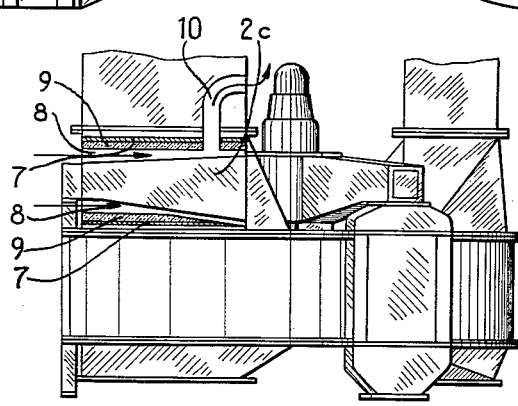

These and other objects and advantages to be obtained from the invention will hereinafter be more fully described with reference to the accompanying drawing, in which:

Figs. 1 and 2 show an air preheater of the ordinary type, the upper view being a front view and the lower a top view, and in the same way, Figs. 3, 4, and 5 show an air preheater according to the present invention, both in front and top views, whereas the third view is a side view showing the third carrier arm partly in axial section.

In the known air preheater according to Figs. 1 and 2 the rotor is accordingly carried by a straight beam 1, the two half parts of the circular effective rotor surface being to disposal for the two channels. In practice the useable surface in the two channels is, of course, somewhat smaller than the half part, since the beam 1 provides a shielded separating zone of a certain width. Referring to these figures it is evident that by placing one of these channels closer to that diametrical surface formed by the beam 1, merely a small increase of the through flow area on this side will be obtained.

In the example shown in Figs. 3, 4, and 5 the circumstances will be quite different by using a main beam of three arms. Of the three arms $2a$, $2b$, and $2c$ the two first ones are placed above the separating surfaces 3 and 4 respectively, separating the large gas channel 5 from the small air channel 6. The third carrier arm $2c$, on the other hand, is placed in a plane cutting the larger channel 5, and in this case diametrically, what is ordinarily suitable, and in that place dividing the centre angle into equal parts. The total effective rotor surface is then subdivided by the separating surfaces 3 and 4 in such a manner that the one channel—in this case the air channel 6—comprises a centre angle $\alpha$ which is smaller than 180 degrees so that the centre angle $\beta$ of the other channel is $360-\alpha$ and consequently greater than 180 degrees. By taking this centre angle, that is by providing the separating surfaces 3 and 4 and the beam arms $2a$ and $2b$ in corresponding positions, it is consequently possible to obtain every desired ratio of the divided rotor surface.

There are two particular alternatives for designing the third arm $2c$. At the embodiment disclosed this arm $2c$, as shown in the upper right section view, is led through the middle of the gas channel. In order to avoid an unallowable heating of the arm $2c$ it is provided with a mantel device 7, which protects the arm against the hot flue gases. The intermediate space 8 between the carrier arm $2c$ and its mantel 7 is in communication with the surrounding atmosphere. On its inside the mantel is provided with a heat insulating cover 9. The small heating amount which in spite of the insulating will enter into the intermediate space 8 is led away by this air without difficulty. As will be evident from the figure referred to the intermediate space 8 is open to the side whereas it is also in communication upwardly with the atmosphere through a duct 10.

The heated air will then rise automatically and the continuous air flow readily carries away the heat entered.

Another alternative for designing the third carrier arm 2c consists therein that it is raised from the rotor housing, that is to place the arm 2c at a greater distance, so that the gas channel can be led below the carrier arm. In this case the third carrier arm is freely provided so that the atmosphere air can flow around it and a particular cooling is then usually dispensed with.

From the above it will be evident that at the air preheater according to the present invention it is possible to choose the ratio between the two through flow areas to such a value which will suit the actual driving conditions. The construction may be made in that way that the determination of the practical angles in question is enabled, so that at the installation place the air preheater may be adjusted relative to the actual driving conditions. Later adjustments of these angles between the beam arms are practically not required, but this possibility, if the driving conditions might be changed in the future, may of course be made open.

With review of the facts now mentioned, that the resistance to flow in gas channel is preferably held at the lowest possible value, whereas an increase of the flow resistance in the air channel can be taken on the expense thereof, the gas channel is in most cases given the larger centre angle, so that the air preheater as shown in Figs. 3, 4 and 5 is the form preferably used in practice. Herein the centre angle of the air channel is 120 degrees and that of the gas channel is 240 degrees, so that the three beam arms 2a, 2b and 2c are disposed at an angle of 120 degrees between each other.

What is claimed:

1. A rotary regenerative heat exchanger for gaseous media comprising a rotor mounted to rotate about a vertical axis and carrying regenerative heat exchanging mass, a stationary structure comprising a housing for said rotor and end plates having inlet and outlet openings separated by angularly related separating portions and providing for two channels of different cross sectional area through the rotor for flow of different gaseous media, one of said channels of larger cross-sectional area providing for flow of heating media and the other of said channels providing for flow of media to be heated, and supporting structure for said rotor comprising three angularly related arms supported by said stationary structure, two of said arms being located above said angularly related separating portions with the channel of lesser cross-sectional area passing therebetween and the third arm being located over the channel of greater cross sectional area through the rotor.

2. Apparatus as defined in claim 1 in which said third arm is located to approximately bisect the cross section of the channel over which it is located.

3. Apparatus as defined in claim 2 in which said arms are located with included angles of 120° between each two adjacent arms.

4. Apparatus as defined in claim 1 in which said third arm extends through a channel in said stationary structure communicating with the rotor channel over which the said third arm is located.

5. Apparatus as defined in claim 4 in which said third arm is encased in a mantle for separating the arm from the gaseous medium flowing through the surrounding channel.

6. Apparatus as defined in claim 5 in which means is provided for circulating cooling air from the ambient atmosphere through a jacket space provided between said mantle and said third arm.

References Cited in the file of this patent

UNITED STATES PATENTS

| 1,858,508 | Kignell et al. | May 17, 1932 |
| 1,957,307 | Von Ohlsen | May 1, 1934 |
| 2,224,787 | Horney | Dec. 10, 1940 |
| 2,468,826 | Karlsson et al. | May 3, 1949 |
| 2,516,992 | Hochmuth | Aug. 1, 1950 |
| 2,549,583 | Eckersley | Apr. 17, 1951 |